(12) United States Patent
Hoelzel et al.

(10) Patent No.: US 8,596,223 B1
(45) Date of Patent: Dec. 3, 2013

(54) FEET WASHING SYSTEM FOR ANIMALS

(71) Applicants: Ellen Hoelzel, Middlesex, NJ (US);
Matthew Hoelzel, Middlesex, NJ (US)

(72) Inventors: Ellen Hoelzel, Middlesex, NJ (US);
Matthew Hoelzel, Middlesex, NJ (US)

( * ) Notice: Subject to any disclaimer, the term of this patent is extended or adjusted under 35 U.S.C. 154(b) by 0 days.

(21) Appl. No.: 13/724,124

(22) Filed: Dec. 21, 2012

(51) Int. Cl.
*A01K 13/00* (2006.01)

(52) U.S. Cl.
USPC ............................. 119/673; 119/603; 119/676

(58) Field of Classification Search
USPC ......... 119/673, 674, 675, 676, 678, 600, 602, 119/603, 604, 651, 652
See application file for complete search history.

(56) References Cited

U.S. PATENT DOCUMENTS

| | | | |
|---|---|---|---|
| 4,317,431 A * | 3/1982 | Sparkes | 119/651 |
| D282,498 S | 2/1986 | Hasse | |
| 4,807,602 A * | 2/1989 | Scarborough et al. | 601/104 |
| D304,235 S | 10/1989 | Chambers | |
| 5,195,455 A * | 3/1993 | van der Lely et al. | 119/14.03 |
| 5,842,442 A * | 12/1998 | Marr | 119/665 |
| 6,439,160 B1 * | 8/2002 | Wheelwright | 119/165 |
| 6,443,164 B1 * | 9/2002 | Parker et al. | 132/333 |
| 6,662,398 B1 * | 12/2003 | Thomson | 15/104.92 |
| 6,739,286 B2 * | 5/2004 | Vander Veen | 119/673 |
| 6,851,391 B1 * | 2/2005 | Mulich et al. | 119/651 |
| 7,111,585 B2 | 9/2006 | Hale et al. | |
| 7,198,007 B2 * | 4/2007 | Bestelmeyer | 119/673 |
| 7,302,915 B2 * | 12/2007 | Leary et al. | 119/664 |
| 7,798,104 B2 * | 9/2010 | Rajkondawar et al. | 119/651 |
| RE42,608 E * | 8/2011 | Vander Veen | 119/673 |
| 2003/0150397 A1 * | 8/2003 | Veen | 119/673 |
| 2004/0216692 A1 * | 11/2004 | Vander Veen | 119/673 |
| 2004/0254511 A1 * | 12/2004 | Brborich | 601/160 |
| 2008/0251026 A1 * | 10/2008 | Bell et al. | 119/168 |
| 2010/0088816 A1 * | 4/2010 | Rollins | 4/568 |
| 2010/0299828 A1 * | 12/2010 | Shapiro | 4/622 |
| 2010/0324611 A1 * | 12/2010 | Deming et al. | 607/2 |
| 2011/0239955 A1 * | 10/2011 | Miller | 119/673 |

* cited by examiner

*Primary Examiner* — Yvonne Abbott

(57) ABSTRACT

A feet washing system has a generally rectangular trough with a planar floor, an anterior side wall, a posterior side wall, a first side wall, and a second side wall. The system has an anterior raised floor support, a posterior raised floor support, and a middle floor support. The system has a fluid inlet and a drain outlet. The system has a generally planar perforated raised floor component. The system has an agitation pump operatively connected to a power supply. The agitation pump is located between the floor and the raised floor component. The system has an anterior side rail located on a top surface of the anterior side wall, a first side rail located on a top surface of the first side wall, and a second side rail located on a top surface of the second side wall.

7 Claims, 5 Drawing Sheets

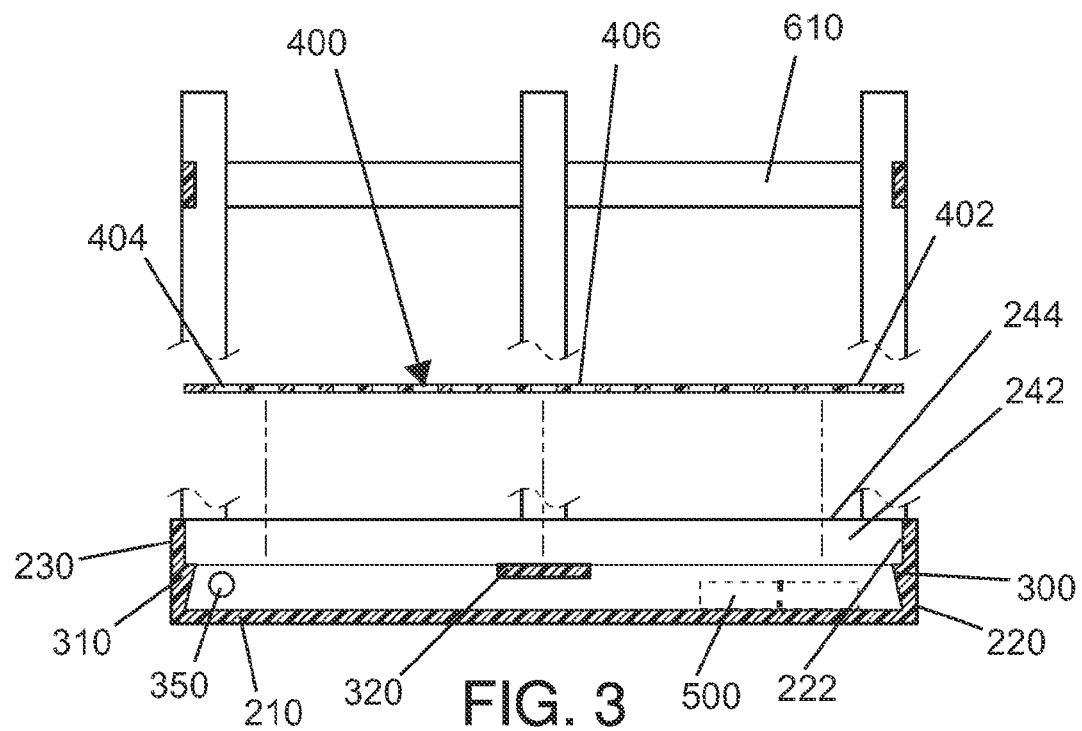
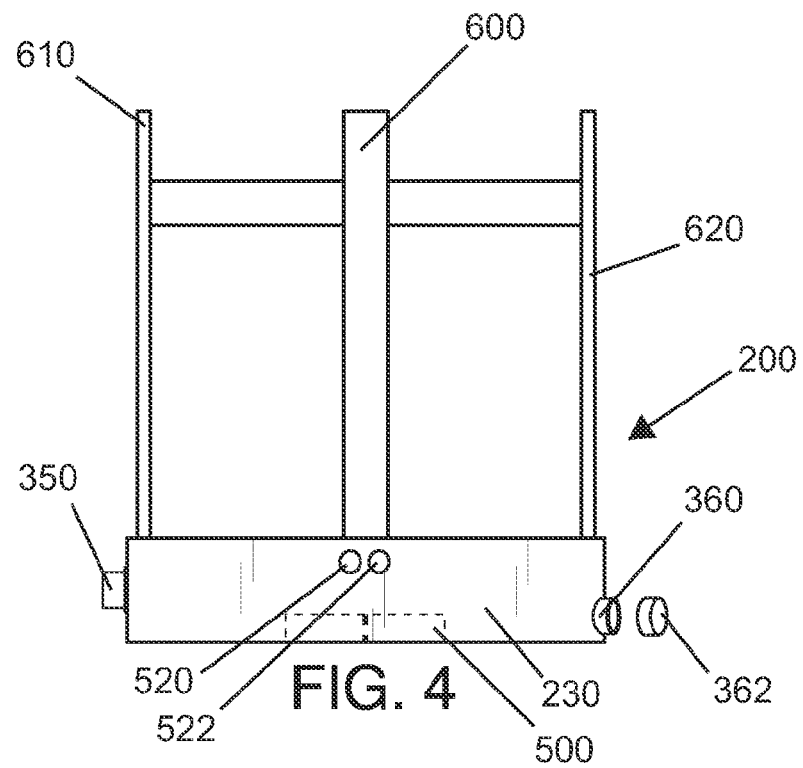

FEET WASHING SYSTEM FOR ANIMALS

BACKGROUND OF THE INVENTION

Often when a pet comes into the house from outside, its paws are muddy which leaves a mess on the flooring surface. Even when the paws are wiped clean, dirt and mud can remain between the toes of the paw. The present invention features a feet washing system for cleaning the feet of an animal using a water circulation bath which effectively cleans the entire paw, even between the toes.

SUMMARY

The present invention features a feet washing system for cleaning the feet of an animal. In some embodiments, the system comprises a generally rectangular trough having a planar floor, an anterior side wall, a posterior side wall, a first side wall, and a second side wall. In some embodiments, the system comprises an anterior raised floor support, a posterior raised floor support, and a middle floor support.

In some embodiments, the system comprises a fluid inlet located on a first side wall or a second side wall. In some embodiments, the system comprises a drain outlet located at an intersection of the first side wall or the second side wall and the posterior side wall.

In some embodiments, the system comprises a generally planar perforated raised floor component located on the anterior raised floor support and the posterior raised floor support. In some embodiments, a middle section of the perforated raised floor component is located on the middle floor support.

In some embodiments, the system comprises an agitation pump operatively connected to a power supply. In some embodiments, the agitation pump is located between the floor and the raised floor component. In some embodiments, the agitation pump is submersible. In some embodiments, a power switch is operatively connected to the agitation pump.

In some embodiments, the system comprises an anterior side rail located on a top surface of the anterior side wall, a first side rail located on a top surface of the first side wall, and a second side rail located on a top surface of the second side wall.

In some embodiments, a fluid is introduced into the trough via the fluid inlet. In some embodiments, the fluid is located at a level to completely submerge the raised floor when the trough is placed with the floor on a level surface. In some embodiments, the fluid is agitated via the agitation pump. In some embodiments, an animal is positioned onto the raised floor via entry from posterior end. In some embodiments, the agitation pump washes the feet of the animal via the fluid.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3 is a cross-sectional view in a sagittal plane of the present invention.

FIG. 4 is a rear view of the present invention.

DESCRIPTION OF PREFERRED EMBODIMENTS

Figure 1:
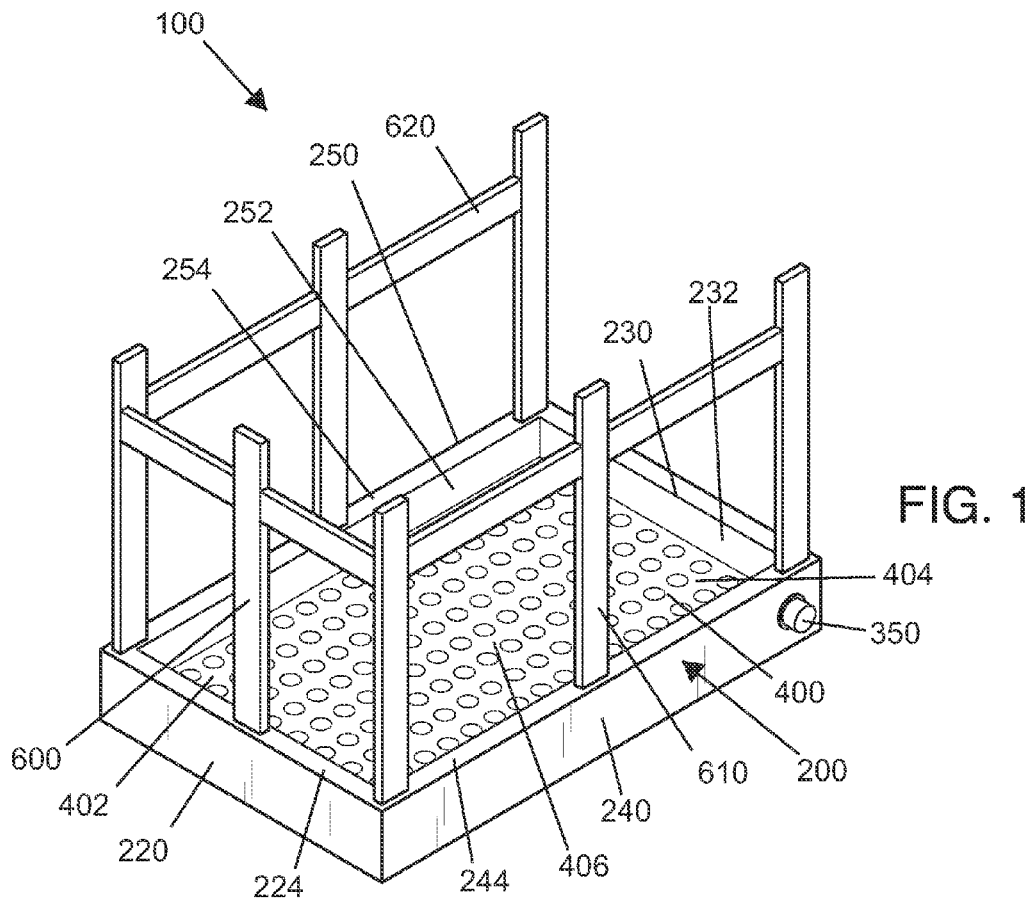
FIG. 1 is a perspective view of the present invention.
Figure 2:
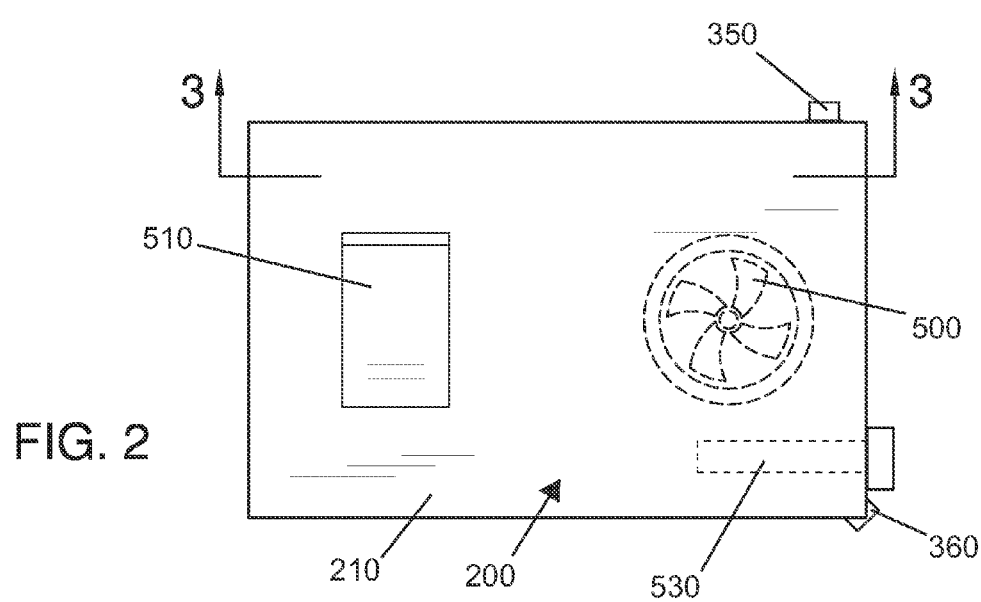
FIG. 2 is a bottom view of the present invention featuring an alternate embodiment of a heating component installed in the trough.
Figure 5:
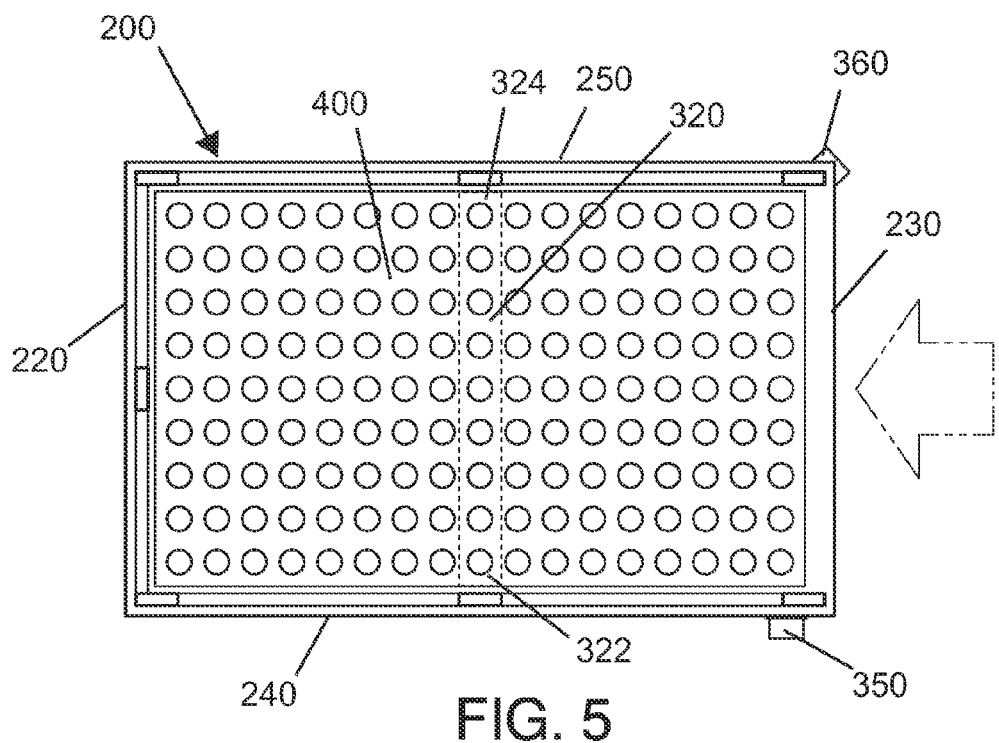
FIG. 5 is a top view of the present invention.
Figure 6:
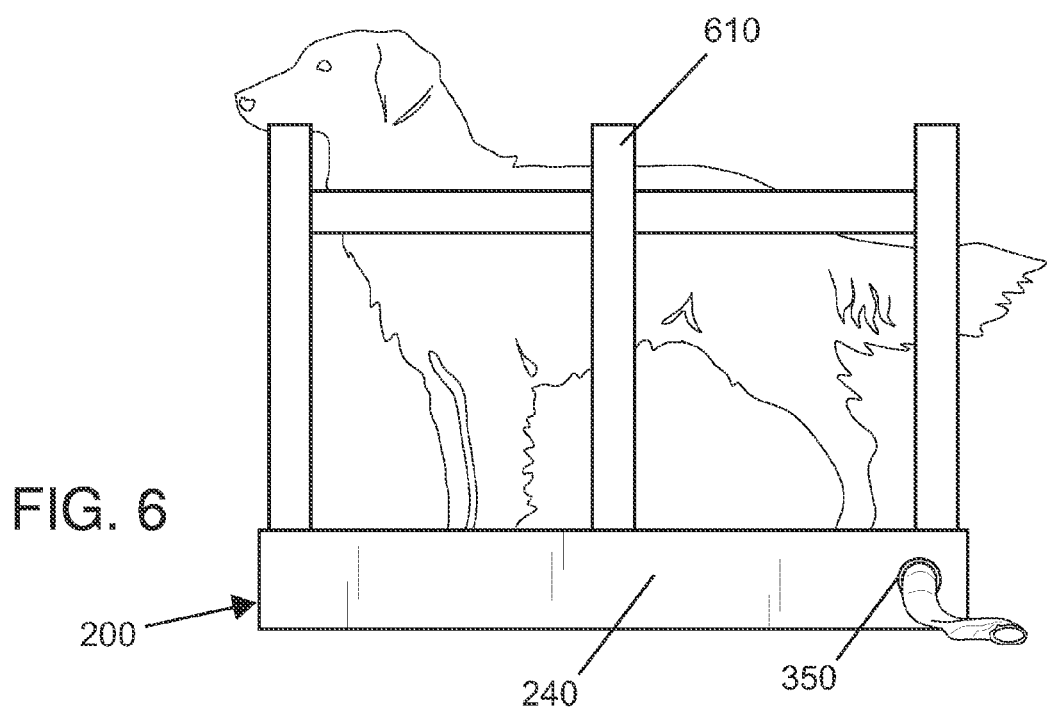
FIG. 6 is a side view of the present invention.
Figure 7:
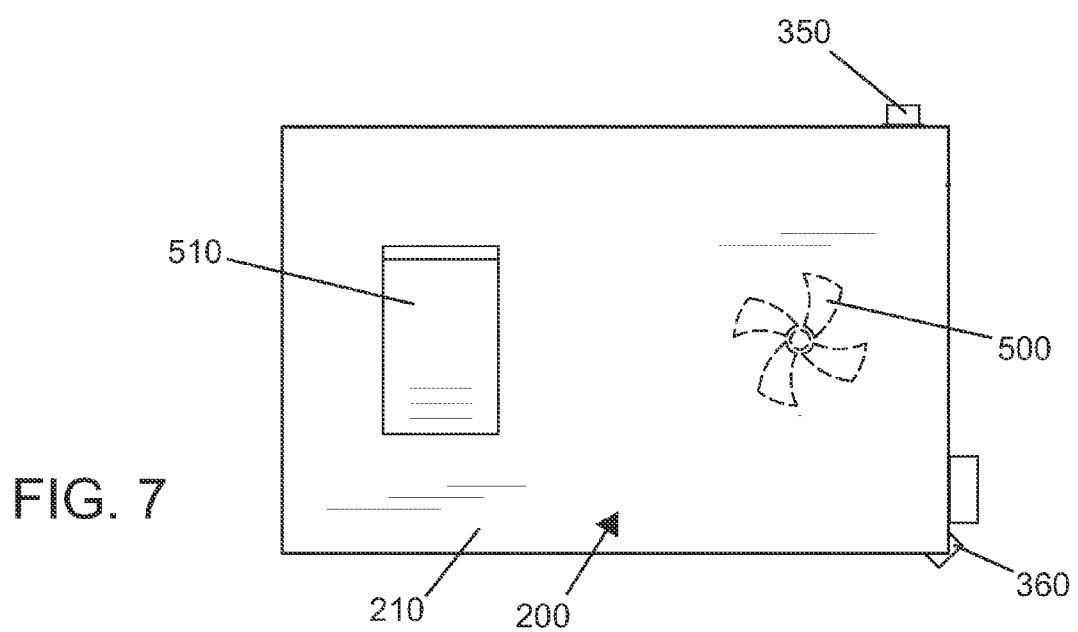
FIG. 7 is a bottom view of an alternate embodiment of the present invention.
Figure 8:
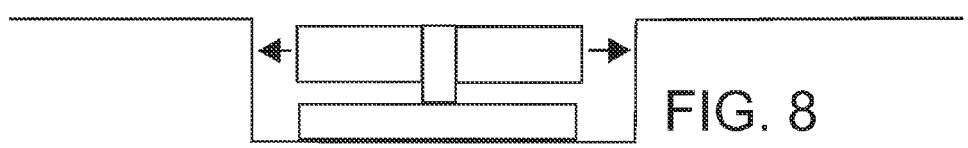
FIG. 8 is a side view of an alternate embodiment of the agitation pump of the present invention.
Figure 9:
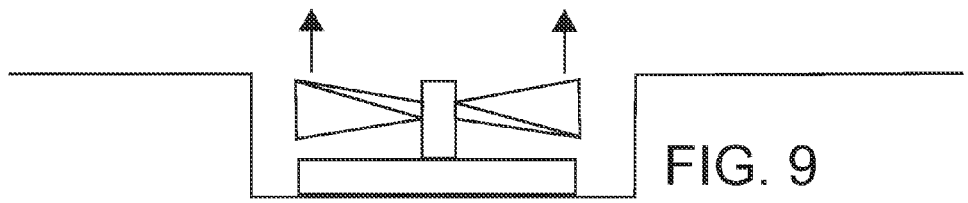
FIG. 9 is a side view of an alternate embodiment of the agitation pump of the present invention.
Figure 10:
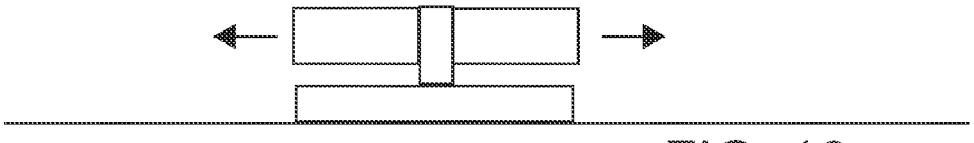
FIG. 10 is a side view of an alternate embodiment of the agitation pump of the present invention.
Figure 11:
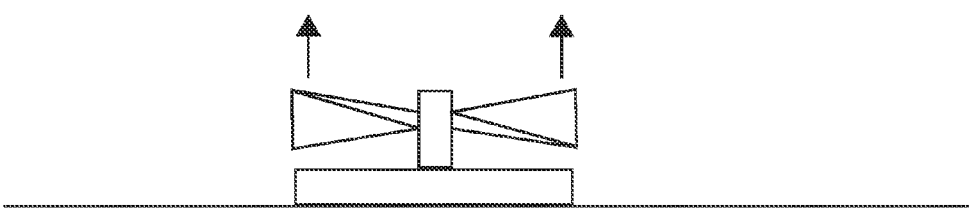
FIG. 11 is a side view of an alternate embodiment of the agitation pump of the present invention.

Following is a list of elements corresponding to a particular element referred to herein:
100 Feet washing system
200 Trough
210 Floor
220 Anterior side wall
222 Anterior side wall inside surface
224 Anterior side wall top surface
230 Posterior side wall
232 Posterior side wall inside surface
240 First side wall
242 First side wall inside surface
244 First side wall top surface
250 Second side wall
252 Second side wall inside surface
254 Second side wall top surface
300 Anterior raised floor support
310 Posterior raised floor support
320 Middle floor support
322 Middle floor support first end
324 Middle floor support second end
350 Fluid inlet
360 Drain outlet
362 Drain stopper
400 Raised floor component
402 Raised floor component first end
404 Raised floor component second end
406 Raised floor component middle section
500 Agitation pump
510 Power supply
520 Power switch
522 Second power switch
530 Heating component
600 Anterior side rail
610 First side rail
620 Second side rail Referring now to FIG. 1-11, the present invention features a feet washing system (100) for cleaning the feet of an animal. In some embodiments, the system (100) comprises a generally rectangular trough (200) having a planar floor (210) located parallel to (or on) a level surface, an anterior side wall (220) located perpendicularly to the floor (210), a posterior side wall (230) located perpendicularly to the floor (210), a first side wall (240) located perpendicularly to the floor (210), and a second side wail (250) located perpendicularly to the floor (210). In some embodiments the trough (200) is circular or oval. In some embodiments, the floor (210) is slanted when placed on a level surface.

In some embodiments, the system (100) comprises an anterior raised floor support (300) located on an anterior side wall inside surface (222), a posterior raised floor support (310) located on a posterior side wall inside surface (232), and a middle floor support (320) having a middle floor support first end (322) located in a middle (midway between the anterior side wall (220) and the posterior side wall (230)) on a first side wall inside surface (242) and a middle floor support second end (324) located in a middle (midway between the anterior side wall (220) and the posterior side wall (230)) on a second side wall inside surface (252). In some embodiments, the middle floor support (320) does not contact the floor (210). In some embodiments, the anterior raised floor support (300) is contiguous with the anterior side wall (220). In some embodiments, the posterior raised floor support (310) is contiguous with the posterior side wall (230). In some embodiments, the system (100) comprises a first side raised floor support on a first side wall inside surface (242) and a second side raised floor support located on a second side wall inside surface (252).

In some embodiments, the system (100) comprises a fluid inlet (350) located on a first side wall (240) or a second side wall (250). In some embodiments, the fluid inlet (350) is fluidly connected to the trough (200). In some embodiments, the fluid inlet (350) comprises threads that sealably interface with standard garden hose threads.

In some embodiments, the system (100) comprises a drain outlet (360) located at an intersection of the first side wall (240) or the second side wall (250) and the posterior side wall (230). In some embodiments, the drain outlet (360) is fluidly connected to the trough (200). In some embodiments, the drain outlet (360) comprises a drain stopper (362).

In some embodiments, the system (100) comprises a generally planar perforated raised floor component (400) having a raised floor component first end (402) located on the anterior raised floor support (300) and a raised floor component second end (404) located on the posterior raised floor support (310). In some embodiments, a raised floor component middle section (406) is located on the middle floor support (320). In some embodiments, the perforations disposed on the raised floor component (400) are circular. In some embodiments, the perforations disposed on the raised floor component (400) are rectangular.

In some embodiments, the system (100) comprises an agitation pump (500) located on the floor (210) close to the posterior side wall (230) operatively connected to a power supply (510). In some embodiments, the agitation pump (500) is located between the floor (210) and the raised floor component (400). In some embodiments, the agitation pump (500) is submersible. In some embodiments, a power switch (520) is operatively connected to the agitation pump (500).

In some embodiments, the system (100) comprises an anterior side rail (600) located on an anterior side wall top surface (224), a first side rail (610) located on a first side wall top surface (244), and a second side rail (620) located on a second side wall top surface (254). In some embodiments, the system (100) comprises a posterior side rail located on a posterior side wall top surface.

In some embodiments, fluid is located in the trough (200) via the fluid inlet (350). In some embodiments, fluid is located at a level to completely submerge the raised floor component (400) when the trough (200) is located with the floor (210) parallel to (or on) a level surface. In some embodiments, the fluid is agitated via the agitation pump (500). In some embodiments, an animal is positioned onto the raised floor component (400) via entry from a posterior end. In some embodiments, the agitation pump (500) washes the feet of the animal.

In some embodiments, a heating component (530) is located between the floor (210) and the raised floor component (400). In some embodiments, the heating component (530) is submersible. In some embodiments, the heating component (530) is operatively connected to the power supply (510). In some embodiments, a second power switch (522) is operatively connected to the heating component (530).

In some embodiments, the power switch (520) is located on the anterior side wall (220), the posterior side wall (230), the first side wall (240), or the second side wall (250). In some embodiments, the second power switch (522) is located on the anterior side wall (220), the posterior side wall (230), the first side wall (240), or the second side wall (250).

In some embodiments, the agitation pump (500) comprises an open impeller (fan blade) for fluid agitation. In some embodiments, the agitation pump (500) comprises an impeller generally enclosed within a pump housing for fluid agitation. In some embodiments, the agitation pump (500) comprises a protective mesh, or wire housing around the impeller. In some embodiments, the agitation pump (500) is at least partially recessed and integrated into the floor (210) as in the case of a sump. In some embodiments, the agitation pomp is spaced a distance from the floor (210).

In some embodiments, the agitation pump (500) rotates in a first direction then a second direction in an oscillating motion for fluid agitation. In some embodiments, the polarity of the agitation pump (500) can be switched or alternated. In some embodiments, the agitation pump (500) rotates in a first direction for fluid agitation.

In some embodiments, the agitation pump (500) comprises an impeller having a plurality of blades. In some embodiments, the agitation (500) comprises an impeller having a plurality of blades having blade surfaces that are perpendicular with respect to the floor (210). In some embodiments, the agitation (500) comprises an impeller having a plurality of blades having blade surfaces that twist from a first end to a second end in a similar manner to that of an airplane propeller or a circular fan blade. In some embodiments the impeller agitates the liquid in an upward direction (or perpendicular) to the agitation pump (500). In some embodiments the impeller agitates the liquid in a sideways direction (or parallel) with the agitation pump (500).

As used herein, the term "about" refers to plus or minus 10% of the referenced number. For example, an embodiment wherein the first side rail is about 10 inches in length includes a first side rail that is between 9 and 11 inches in length.

The disclosures of the following U.S. Patents are incorporated in their entirety by reference herein: U.S. Pat. No. D 304,235; U.S. Pat. No. D 282,498; U.S. 2011/0239955 A1; U.S. Pat. No. 7,798,104; U.S. Pat. No. 7,198,007; U.S. Pat. No. 7,111,585; U.S. Pat. No. 6,439,160; U.S. Pat. No. 4,317,431.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A feet washing system (100) for cleaning the feet of an animal, wherein said system (100) comprises:
   (a) a generally rectangular trough (200) having a planar floor (210) disposed parallel to (or on) a level surface, an anterior side wall (220) disposed perpendicularly to the floor (210), a posterior side wall (230) disposed perpendicularly to the floor (210), a first side wall (240) disposed perpendicularly to the floor (210), and a second side wall (250) disposed perpendicularly to the floor (210);
   (b) an anterior raised floor support (300) disposed on an anterior side wall inside surface (222), a posterior raised floor support (310) disposed on a posterior side wall inside surface (232), and a middle floor support (320) having a middle floor support first end (322) disposed in a middle (midway between the anterior side wall (220) and the posterior side wall (230)) on a first side wall inside surface (242) and a middle floor support second end (324) disposed in a middle (midway between the anterior side wall (220) and the posterior side wall (230)) on a second side wall inside surface (252), wherein the middle floor support (320) does not contact the floor (210), wherein the anterior raised floor support (300) is contiguous with the anterior side wall (220), wherein the posterior raised floor support (310) is contiguous with the posterior side wall (230);
   (c) a fluid inlet (350) disposed on a first side wall (240) or a second side wall (250), wherein the fluid inlet (350) is fluidly connected to the trough (200);
   (d) a drain outlet (360) disposed at an intersection of the first side wall (240) or the second side wall (250) and the posterior side wall (230), wherein the drain outlet (360) is fluidly connected to the trough (200), wherein the drain outlet (360) comprises a drain stopper (362);
   (e) a generally planar perforated raised floor component (400) having a raised floor component first end (402) disposed on the anterior raised floor support (300) and a raised floor component second end (404) disposed on the posterior raised floor support (310), wherein a raised floor component middle section (406) is disposed on the middle floor support (320);
   (f) an agitation pump (500) disposed on the floor (210) proximal to the posterior side wall (230) operatively connected to a power supply (510), wherein the agitation pump (500) is disposed between the floor (210) and the raised floor component (400), wherein the agitation pump (500) is submersible, wherein a power switch (520) is operatively connected to the agitation pump (500);
   (g) an anterior side rail (600) disposed on an anterior side wall top surface (224), a first side rail (610) disposed on a first side wall top surface (244), and a second side rail (620) disposed on a second side wall top surface (254);
   wherein fluid is disposed in the trough (200) via the fluid inlet (350), wherein the fluid is disposed at a level to completely submerge the raised floor component (400) when the trough (200) is disposed with the floor (210) parallel to (or on) a level surface, wherein the fluid is agitated via the agitation pump (500), wherein an animal is positioned onto the raised floor component (400) via entry from a posterior end, wherein the agitation pump (500) washes the feet of the animal.

2. The system (100) of claim 1, wherein a heating component (530) is disposed between the floor (210) and the raised floor component (400), wherein the heating component (530) is submersible, wherein the heating component (530) is operatively connected to the power supply (510), wherein a second power switch (522) is operatively connected to the heating component (530).

3. The system (100) of claim 1, wherein the agitation pump (500) comprises an open impeller (fan blade) for fluid agitation.

4. The system (100) of claim 1, wherein the agitation pump (500) comprises an impeller generally enclosed within a pump housing for fluid agitation.

5. The system (100) of claim 1, wherein the agitation pump (500) is at least partially recessed and integrated into the floor (210).

6. The system (100) of claim 1, wherein the agitation pump (500) rotates in a first direction then a second direction in an oscillating motion for fluid agitation.

7. The system (100) of claim 1, wherein the agitation pump (500) rotates in a first direction for fluid agitation.

\* \* \* \* \*